United States Patent
Hayakawa

(10) Patent No.: US 11,279,606 B2
(45) Date of Patent: Mar. 22, 2022

(54) STERILE CARBONATED BEVERAGE FILLING SYSTEM AND STERILE CARBONATED BEVERAGE FILLING METHOD

(71) Applicant: Dai Nippon Printing Co., Ltd., Tokyo (JP)

(72) Inventor: Atsushi Hayakawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 224 days.

(21) Appl. No.: 16/336,647

(22) PCT Filed: Sep. 27, 2017

(86) PCT No.: PCT/JP2017/035032
§ 371 (c)(1),
(2) Date: Mar. 26, 2019

(87) PCT Pub. No.: WO2018/062311
PCT Pub. Date: Apr. 5, 2018

(65) Prior Publication Data
US 2019/0375622 A1    Dec. 12, 2019

(30) Foreign Application Priority Data

Sep. 30, 2016 (JP) .............................. JP2016-194492

(51) Int. Cl.
*A23L 3/00* (2006.01)
*B67C 7/00* (2006.01)
(Continued)

(52) U.S. Cl.
CPC .............. *B67C 7/0073* (2013.01); *A23L 2/46* (2013.01); *A23L 2/54* (2013.01); *A23L 3/001* (2013.01);
(Continued)

(58) Field of Classification Search
CPC ... B67C 7/0073; B67C 3/22; B67C 2003/228; B67C 3/225; A23L 2/46; A23L 2/54;
(Continued)

(56) References Cited

U.S. PATENT DOCUMENTS 1,990,519 A * 2/1935 Bigelow ................ F16J 15/162
277/513
2,049,774 A * 8/1936 Hoffman ................. F16J 15/40
277/500
(Continued)

FOREIGN PATENT DOCUMENTS

CH       351501 A   1/1961
CH       680232 A5  7/1992
(Continued)

OTHER PUBLICATIONS

Chinese Office Action (Application No. 201780060570.1) dated Jul. 21, 2020 (with English translation).
(Continued)

*Primary Examiner* — Drew E Becker
(74) *Attorney, Agent, or Firm* — Burr & Brown, PLLC

(57) ABSTRACT

A sterile carbonated beverage filling system includes a beverage sterilizing section which sterilizes a raw material liquid to prepare a sterilized beverage, a beverage cooling section which cools the sterilized beverage, a carbonated beverage producing section which injects carbonic acid gas into the sterilized beverage to prepare a sterile carbonated beverage, and a carbonated beverage filling section which fills the sterile carbonated beverage into a bottle. The beverage sterilizing section, the beverage cooling section, the carbonated beverage producing section, and the carbonated beverage filling section are connected by a beverage supply pipeline. The carbonated beverage filling section and the beverage supply pipeline each include a rotary machine, and a boundary surface between a rotating body and a
(Continued)

non-rotating body of the rotary machine is sealed with sterile water or sterile air.

7 Claims, 4 Drawing Sheets

(51) Int. Cl.
| | |
|---|---|
| *A23L 2/46* | (2006.01) |
| *A23L 2/54* | (2006.01) |
| *B67C 3/22* | (2006.01) |
| *B65B 25/00* | (2006.01) |
| *B65B 55/14* | (2006.01) |
| *F04D 29/08* | (2006.01) |

(52) U.S. Cl.
CPC ............ *B65B 25/001* (2013.01); *B65B 55/14* (2013.01); *B67C 3/22* (2013.01); *B67C 3/225* (2013.01); *F04D 29/08* (2013.01); *A23V 2002/00* (2013.01); *B67C 2003/228* (2013.01)

(58) Field of Classification Search
CPC ..... A23L 2/42–2/50; A23L 3/16–3/325; A23L 3/001; A23V 2002/00; F04D 1/00–1/14; F04D 17/00–17/18; F04D 29/08–29/168; F16L 27/023; F16L 27/08; B65B 3/12; B65B 25/001; B65B 55/12–55/18; F16J 15/16; F16J 15/40–15/43
USPC .......................................................... 426/399
See application file for complete search history.

(56) References Cited

U.S. PATENT DOCUMENTS

| | | | | | |
|---|---|---|---|---|---|
| 2,555,492 | A | * | 6/1951 | Kidney | F16J 15/40 277/369 |
| 3,138,178 | A | * | 6/1964 | McK | B65B 55/14 141/82 |
| 3,191,545 | A | * | 6/1965 | Funk | F16J 15/002 277/390 |
| 3,259,071 | A | * | 7/1966 | Nellis | F04D 29/628 415/175 |
| 3,542,567 | A | * | 11/1970 | Bowen | B65B 55/10 426/87 |
| 3,563,571 | A | * | 2/1971 | Werra | F16L 23/16 285/41 |
| 3,909,014 | A | * | 9/1975 | Loliger | F16K 41/003 277/432 |
| 4,688,991 | A | * | 8/1987 | Howard | F04D 29/126 277/364 |
| 4,873,094 | A | * | 10/1989 | Pischke | A23C 13/08 426/43 |
| 4,999,978 | A | * | 3/1991 | Kohlbach | B65B 55/022 53/512 |
| 5,431,198 | A | * | 7/1995 | Turtchan | B65B 55/02 141/1 |
| 6,105,634 | A | * | 8/2000 | Liebram | B65B 55/027 141/237 |
| 2002/0114872 | A1 | * | 8/2002 | Kaplan | A23C 9/1524 426/580 |
| 2007/0204562 | A1 | * | 9/2007 | Till | B67C 7/0073 53/167 |
| 2009/0320415 | A1 | * | 12/2009 | Senbon | B65B 55/14 53/469 |
| 2010/0037986 | A1 | * | 2/2010 | Neumann | F16J 15/002 141/91 |
| 2010/0170867 | A1 | * | 7/2010 | Hayakawa | B67C 7/0073 215/379 |
| 2012/0127825 | A1 | * | 5/2012 | Kojima | B01F 7/18 366/331 |
| 2012/0128725 | A1 | * | 5/2012 | Akira | A61K 39/015 424/278.1 |
| 2016/0122170 | A1 | * | 5/2016 | Quagliarella | B67C 3/2614 141/59 |

FOREIGN PATENT DOCUMENTS

| | | |
|---|---|---|
| CN | 101795940 A | 8/2010 |
| EP | 2 070 865 A1 | 6/2009 |
| EP | 2 070 865 B1 | 12/2015 |
| JP | S63-082901 A1 | 4/1988 |
| JP | H11-132376 A1 | 5/1999 |
| JP | 2004-270915 A1 | 9/2004 |
| JP | 3574887 B2 | 10/2004 |
| JP | 2005-014918 A1 | 1/2005 |
| JP | 2006-211931 A1 | 8/2006 |
| JP | 2010-042833 A1 | 2/2010 |
| JP | 2014-055026 A1 | 3/2014 |
| JP | 2015-098363 A1 | 5/2015 |
| JP | 2015-120555 A1 | 7/2015 |
| JP | 2015-205734 A1 | 11/2015 |
| JP | 2016-088621 A1 | 5/2016 |
| JP | 2016-094250 A1 | 5/2016 |
| WO | 2010/137486 A1 | 12/2010 |

OTHER PUBLICATIONS

English translation of International Preliminary Report on Patentability (Chapter I) (Application No. PCT/JP2017/035032) dated Apr. 11, 2019, 9 pages.
Extended European Search Report (Application No. 17856260.9) dated May 8, 2020.
Japanese Office Action (Application No. 2018-125309) dated May 7, 2019 (with English translation).
International Search Report and Written Opinion (Application No. PCT/JP2017/035032) dated Nov. 14, 2017.
Japanese Office Action (Application No. 2016-194492) dated Aug. 25, 2017 (with English translation).
Japanese Office Action (Application No. 2016-194492) dated Mar. 30, 2018 (with English translation).
Japanese Office Action (Appeal No. 2018-009017 (Application No. 2016-194492)) dated Oct. 12, 2018 (with English translation).

* cited by examiner

STERILE CARBONATED BEVERAGE FILLING SYSTEM AND STERILE CARBONATED BEVERAGE FILLING METHOD

BACKGROUND OF THE INVENTION

1. Field of the Invention

The present invention relates to a sterile carbonated beverage filling system and a sterile carbonated beverage filling method.

2. Description of Related Art

Conventionally, a container containing a beverage including carbonated beverages containing ingredients derived from animals or plants such as fruit juice and milk ingredients has been produced. In this case, a heat sterilization treatment is performed in which a carbonated beverage is first filled in a container (PET bottle), and then the carbonated beverage is heated together with the container. The heat sterilization treatment can suppress propagation of fungi, yeasts and other microorganisms in carbonated beverages. For example, in the case of carbonated beverages containing fruit juice, a carbon dioxide gas is pressure-injected at low temperature into a composition liquid prepared by mixing nitrogen sources such as fruit juice and milk ingredients. Thereafter, the composition liquid in which the carbon dioxide gas has been dissolved is filled in a container, and the container is sealed with a cap. Subsequently, the carbonated beverage filled in the container is heat-sterilized from the outside of the container, and the carbonated beverage and the container are simultaneously sterilized. The heat sterilization treatment is generally carried out under the condition that the carbonated beverage is heated at a liquid temperature of 60° C. or more and 65° C. or less in about 10 minutes.

CITATION LIST

Patent Literature

Patent Literature 1: JP 2006-211931 A

However, when the conventional heat sterilization treatment is carried out, there is a possibility that contents made of a carbonated beverage, for example, a content liquid containing a nitrogen source such as fruit juice and milk ingredients, is deteriorated. In addition, since a container expands during the heat sterilization treatment, inconvenience such as deformation of the container occurs. For this reason, it is studied to fill carbonated beverages into a container using aseptic filling equipment so that the heat sterilization treatment will not be carried out.

On the other hand, in conventional aseptic filling equipment, in order to seal a boundary surface between a rotating body such as a pump and a non-rotating body, high-temperature steam is supplied to a seal portion between the rotating body and the non-rotating body. However, in the case of filling a carbonated beverage using the aseptic filling equipment, when high-temperature steam is supplied to the seal portion, the liquid temperature of the carbonated beverage staying in the vicinity of the seal portion rises, and when the carbonated beverage is filled, a large amount of foam may be generated from the carbonated beverage in a container (also referred to as "foaming"), or a carbonic acid gas concentration in the carbonated beverage may become unstable. Particularly, when the aseptic filling equipment temporarily stops, the carbonated beverages tend to stay in the vicinity of the seal portion, so that such a problem becomes noticeable.

The present invention has been made in view of the above-described problems, and it is an object of the present invention to provide a sterile carbonated beverage filling system and a sterile carbonated beverage filling method in which, when a carbonated beverage is filled using aseptic filling equipment, it is possible to prevent a large amount of foam from being generated from the carbonated beverage in a container and to prevent a carbonic acid gas concentration in the carbonated beverage from becoming unstable.

SUMMARY OF THE INVENTION

The present invention is a sterile carbonated beverage filling system, and the sterile carbonated beverage filling system includes a beverage sterilizing section which sterilizes a raw material liquid to prepare a sterilized beverage, a beverage cooling section which cools the sterilized beverage prepared by the beverage sterilizing section, a carbonated beverage producing section which injects carbonic acid gas into the sterilized beverage cooled by the beverage cooling section to prepare a sterile carbonated beverage, a carbonated beverage filling section which fills the sterile carbonated beverage, prepared by the carbonated beverage producing section, into a bottle, and a beverage supply pipeline which connects the beverage sterilizing section, the beverage cooling section, the carbonated beverage producing section, and the carbonated beverage filling section, at least one of the carbonated beverage filling section and the beverage supply pipeline includes a rotary machine having a rotating body and a non-rotating body, and a boundary surface between the rotating body and the non-rotating body is sealed with sterile water or sterile air.

The present invention is the sterile carbonated beverage filling system in which the rotary machine is a pump provided in the beverage supply pipeline.

The present invention is the sterile carbonated beverage filling system in which an internal pressure of a seal portion which seals the boundary surface is lower than an internal pressure of the beverage supply pipeline.

The present invention is the sterile carbonated beverage filling system in which the rotary machine is a rotary joint of the carbonated beverage filling section.

The present invention is the sterile carbonated beverage filling system in which an internal pressure of a seal portion which seals the boundary surface is lower than an internal pressure of a pipe through which the sterile carbonated beverage located inside the rotary joint flows.

The present invention is a sterile carbonated beverage filling method, including a sterilization step of sterilizing a raw material liquid in a beverage sterilizing section to prepare a sterilized beverage, a cooling step of cooling the sterilized beverage, prepared by the beverage sterilizing section, in a beverage cooling section, a carbonated beverage producing step of injecting carbonic acid gas into the sterilized beverage, cooled by the beverage cooling section, in a carbonated beverage producing section to prepare a sterile carbonated beverage, and a filling step of filling the sterile carbonated beverage, prepared by the carbonated beverage producing section, into a bottle in a carbonated beverage filling section, the beverage sterilizing section, the beverage cooling section, the carbonated beverage producing section, and the carbonated beverage filling section are connected by a beverage supply pipeline, at least one of the carbonated beverage filling section and the beverage supply pipeline includes a rotary machine having a rotating body and a non-rotating body, and a boundary surface between the rotating body and the non-rotating body is sealed with sterile water or sterile air.

According to the present invention, when a carbonated beverage is filled into a bottle by using the sterile carbonated beverage filling system, it is possible to prevent a large amount of foam from being generated from the carbonated beverage in a container and to prevent a carbonic acid gas concentration in the carbonated beverage from becoming unstable.

DETAILED DESCRIPTION OF THE INVENTION

Figure 1:
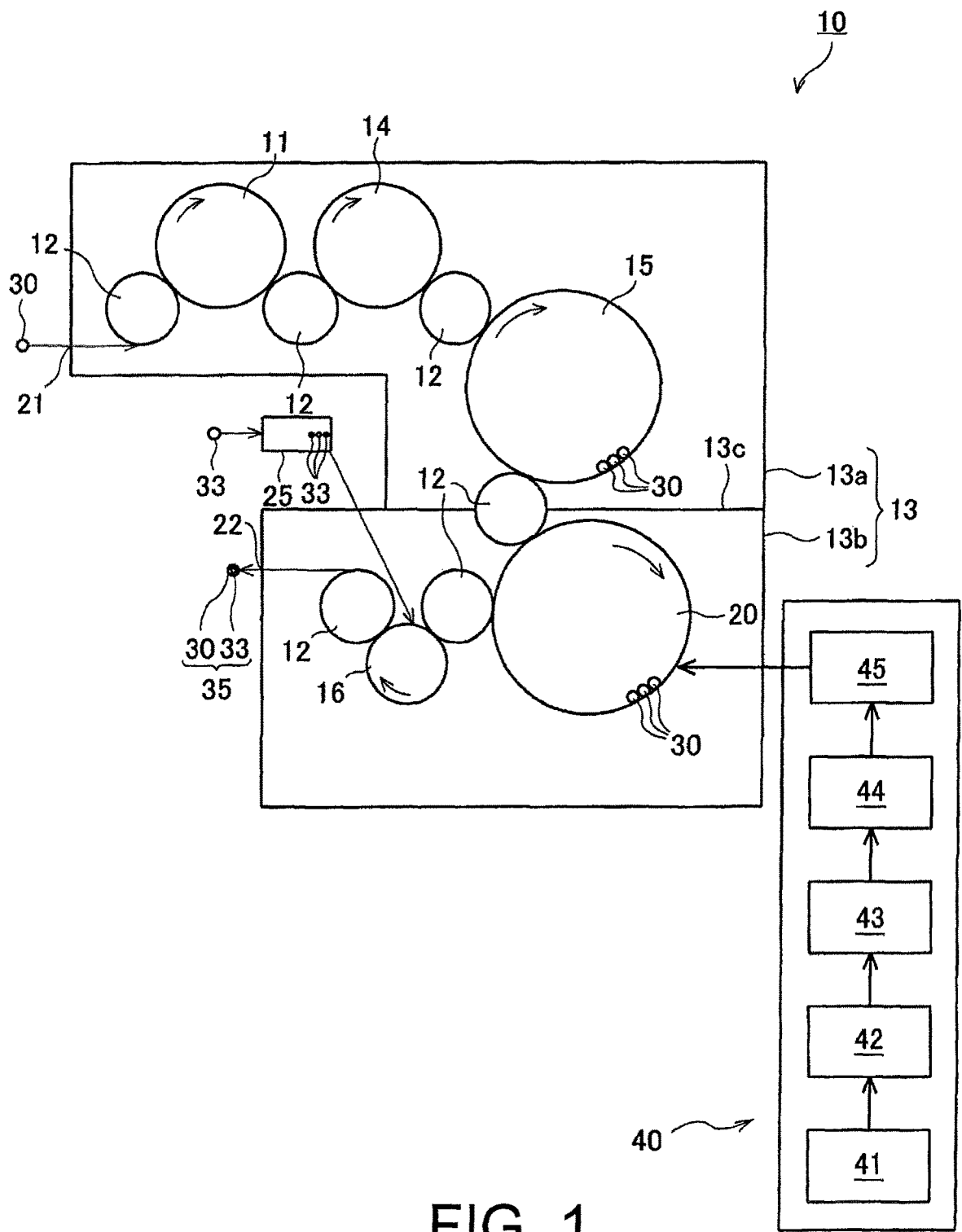
FIG. 1 is a schematic plan view illustrating a sterile carbonated beverage filling system according to an embodiment of the present invention.

An embodiment of the present invention will be described below with reference to FIGS. 1 to 4. FIGS. 1 to 4 illustrate one embodiment of the present invention. In the following drawings, the same reference numerals are assigned to the same components, and some detailed descriptions may be omitted.

(Sterile Carbonated Beverage Filling System)

First, a sterile carbonated beverage filling system according to the present embodiment will be described with reference to FIG. 1.

A sterile carbonated beverage filling system 10 illustrated in FIG. 1 is a system for filling a bottle (container) 30 with a content made of a sterile carbonated beverage. The bottle 30 can be made by performing biaxial stretching blow molding on a preform made by performing injection molding on a synthetic resin material. A material of the bottle 30 to be used is preferably a thermoplastic resin, in particular, polyethylene (PE), polypropylene (PP), polyethylene-terephthalate (PET), or polyethylene naphthalate (PEN). In addition, the container may be glass or a can. The present embodiment will describe an example of a case where a plastic bottle is used for the container.

As illustrated in FIG. 1, the sterile carbonated beverage filling system 10 includes a bottle feeding section 21, a bottle sterilizing section 11, an air rinsing section 14, a sterile water rinsing section 15, a carbonated beverage filling section (filler) 20, a cap attachment section (a capper, a seamer, and a capping machine) 16, and a product bottle conveyor 22. These bottle feeding section 21, bottle sterilizing section 11, air rinsing section 14, sterile water rinsing section 15, carbonated beverage filling section 20, cap attachment section 16, and product bottle conveyor 22 are arranged in this order along a conveying direction of the bottle 30 from an upstream side to a downstream side.

Between the bottle sterilizing section 11, the air rinsing section 14, the sterile water rinsing section 15, the carbonated beverage filling section 20, and the cap attachment section 16, a plurality of convey wheels 12 for conveying the bottle 30 between these devices is provided.

The bottle feeding section 21 successively receives the empty bottle 30 from an outside to the sterile carbonated beverage filling system 10, and conveys the received bottle 30 to the bottle sterilizing section 11.

A bottle molding portion (not illustrated) which molds the bottle 30 by performing biaxial stretching blow molding on a preform may be provided on the upstream side of the bottle feeding section 21. As described above, the process starting upon feeding of the preform, and then molding of the bottle 30, and ending upon filling of the bottle 30 with the sterile carbonated beverage and capping may be performed continuously. In this case, instead of the bottle 30 having a large volume, a preform having a small volume can be carried from the outside to the sterile carbonated beverage filling system 10, so that equipment constituting the sterile carbonated beverage filling system 10 can be reduced in size.

The bottle sterilizing section 11 sterilizes the interior of the bottle 30 by injecting a disinfectant into the bottle 30. As the disinfectant, a hydrogen peroxide aqueous solution is used, for example. In the bottle sterilizing section 11, after a hydrogen peroxide aqueous solution having a concentration of 1% by weight or more, preferably 35% by weight is temporarily vaporized, condensed mist or gas is generated, and the mist or gas is sprayed on inner and outer surfaces of the bottle 30. Since the inside of the bottle 30 is thus sterilized by the mist or gas of the hydrogen peroxide aqueous solution, the inner surface of the bottle 30 is sterilized uniformly.

The air rinsing section 14 supplies sterile heated air or room temperature air into the bottle 30 to remove foreign matter, hydrogen peroxide, and the like from the inside of the bottle 30 while activating the hydrogen peroxide.

The sterile water rinsing section 15 washes the bottle 30, sterilized by hydrogen peroxide as a disinfectant, with sterilized water at 15° C. or more and 85° C. or less. As a result, hydrogen peroxide adhering to the bottle 30 is washed off, and foreign matter is removed. The sterile water rinsing section 15 is not necessarily provided.

The carbonated beverage filling section 20 fills the sterile carbonated beverage, previously sterilized, from a mouth of the bottle 30 into the bottle 30. This carbonated beverage filling section 20 fills the sterile carbonated beverage in the empty bottle 30. In the carbonated beverage filling section 20, while a plurality of the bottles 30 is rotated (revolved), the sterile carbonated beverage is filled inside the bottles 30. The sterile carbonated beverage is filled into the bottle 30 at a filling temperature of 1° C. or more and 40° C. or less, preferably 5° C. or more and 10° C. or less. The reason why the filling temperature of the sterile carbonated beverage is set to, for example, 1° C. or more and 10° C. or less as described above is that if the liquid temperature of the sterile carbonated beverage exceeds 10° C., a carbon dioxide gas is likely to escape from the sterile carbonated beverage. Examples of the sterile carbonated beverage to be filled by the carbonated beverage filling section 20 include carbonated beverages containing ingredients derived from animals or plants such as fruit juice and milk ingredients.

The carbonated beverage supplied to the carbonated beverage filling section 20 is prepared in advance by a carbonated beverage preparation section 40. The carbonated beverage filling section 20 fills the inside of the bottle 30 with the carbonated beverage sent from the carbonated beverage preparation section 40. The configuration of the carbonated beverage preparation section 40 will be described later.

The cap attachment section 16 caps the bottle 30 by attaching the cap 33 to the mouth of the bottle 30. In the cap attachment section 16, the mouth of the bottle 30 is capped with the cap 33 and then sealed so as to prevent external air or virus from invading into the bottle 30. In the cap attachment section 16, while the plurality of bottles 30 filled with the sterile carbonated beverage rotates (revolves), the caps 33 are attached to the mouths of the bottles 30. Thus, by attaching the cap 33 to the mouth of the bottle 30, it is possible to obtain a product bottle 35.

The cap 33 is sterilized in a cap sterilizing section 25 in advance. The cap sterilizing section 25 is disposed outside a sterile chamber 13 (to be described later) and near the cap attachment section 16, for example. In the cap sterilizing section 25, a large number of the caps 33 carried in from the outside are preliminarily collected and then conveyed in a row toward the cap attachment section 16. Mist or gas of hydrogen peroxide is blown against inner and outer surfaces of the cap 33 on the way of conveyance of the cap 33 toward the cap attachment section 16 and then the cap 33 is dried with hot air and sterilized.

The product bottle conveyor 22 continuously conveys the product bottle 35 with the cap 33 attached by the cap attachment section 16 to the outside of the sterile carbonated beverage filling system 10.

In addition, the sterile carbonated beverage filling system 10 includes the sterile chamber 13. The sterile chamber 13 houses the bottle sterilizing section 11, the air rinsing section 14, the sterile water rinsing section 15, the carbonated beverage filling section 20, and the cap attachment section 16, which have been described above. The interior of the sterile chamber 13 is kept in a sterile state.

In addition, the sterile chamber 13 is partitioned into a bottle sterile chamber 13a and a filling/seaming chamber 13b. A chamber wall 13c is provided between the bottle sterile chamber 13a and the filling/seaming chamber 13b, and the bottle sterile chamber 13a and the filling/seaming chamber 13b are separated from each other with the chamber wall 13c interposed therebetween. In the bottle sterile chamber 13a, the bottle sterilizing section 11, the air rinsing section 14, and the sterile water rinsing section 15 are arranged. In the filling/seaming chamber 13b, the carbonated beverage filling section 20 and the cap attachment section 16 are arranged.

(Sterile Carbonated Beverage Filling System)

Figure 2:
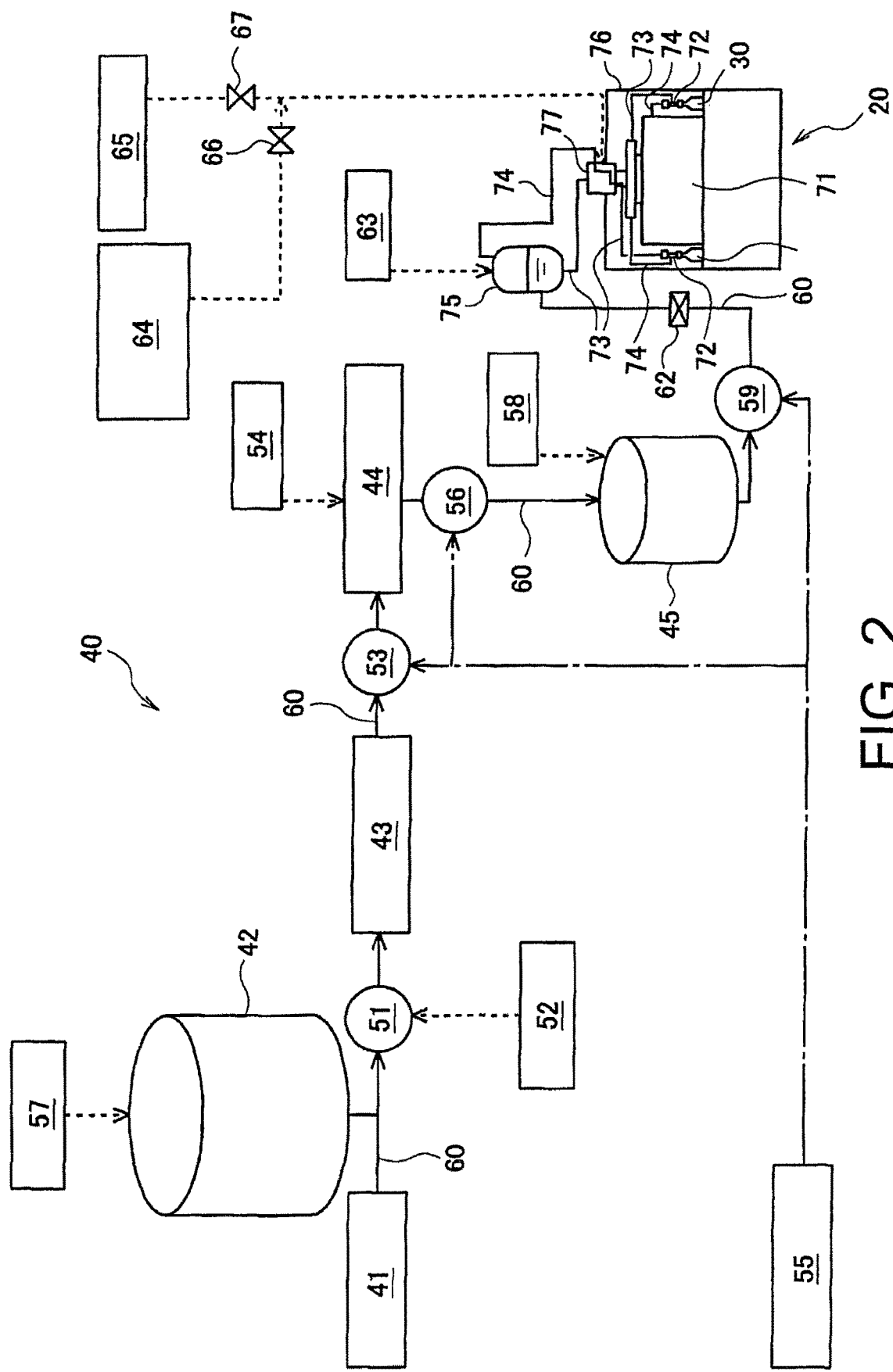
FIG. 2 is a schematic configuration diagram illustrating a carbonated beverage preparation section and a carbonated beverage filling section of the sterile carbonated beverage filling system according to an embodiment of the present invention.

Next, the configuration of the carbonated beverage preparation section 40 and the carbonated beverage filling section 20 of the sterile carbonated beverage filling system 10 will be described with reference to FIG. 2. In FIG. 2, solid arrows indicate flows of beverages (raw material liquid, sterilized beverage, sterile carbonated beverage), dotted arrows indicate flows of gas (steam, sterile carbon dioxide gas), and dash-dotted arrows indicate flow of water (sterile water).

As illustrated in FIG. 2, the carbonated beverage preparation section 40 includes a beverage sterilizing section 41, a first aseptic tank 42, a beverage cooling section 43, a carbonated beverage producing section 44, and a second aseptic tank 45.

Among these parts, for example, the beverage sterilizing section 41 sterilizes a raw material liquid containing components derived from animals or plants such as fruit juice and milk ingredients to produce a sterilized beverage. The beverage sterilizing section 41 may be constituted of an ultra high temperature instantaneous sterilizer (UHT: Ultra High-Temperature), for example. In this case, a raw material liquid is supplied from the outside to the beverage sterilizing section 41 constituted of the UHT, and this raw material liquid is instantaneously heated and sterilized to prepare a sterilized beverage.

The first aseptic tank 42 temporarily stores the sterilized beverage sterilized by the beverage sterilizing section 41. Sterile air is supplied from a sterile air supply section 57 into the first aseptic tank 42 and filled in the first aseptic tank 42. The first aseptic tank 42 may not necessarily be provided, and the sterilized beverage from the beverage sterilizing section 41 may be supplied directly to the beverage cooling section 43.

Between the first aseptic tank 42 and the beverage cooling section 43, a first pump 51 is provided. The first pump 51 is for feeding the sterilized beverage from the first aseptic tank 42 to the beverage cooling section 43. Steam is supplied from a steam supply section 52 to the first pump 51. The temperature of the steam from the steam supply section 52 is, for example, about 90° C. or more and 140° C. or less, and the steam is used for the mechanical seal of the first pump 51. As described above, by supplying steam to a space surrounding a boundary surface of the mechanical seal, bacteria and microorganisms from the outside world are prevented from being mixed in a sterilized beverage through the boundary surface.

The beverage cooling section 43 cools the sterilized beverage prepared by the beverage sterilizing section 41. The beverage cooling section 43 has a cooling plate or a cooling shell and a tube. In the beverage cooling section 43, the sterilized beverage is cooled to, for example, 1° C. or more and 5° C. or less. As a result, in the carbonated beverage producing section 44 carbon dioxide gas is easily dissolved in the sterilized beverage.

A second pump (rotary machine) 53 is provided between the beverage cooling section 43 and the carbonated beverage producing section 44. The second pump 53 is for feeding the sterilized beverage from the beverage cooling section 43 to the carbonated beverage producing section 44. Sterile water is supplied from a sterile water sterilization supply section 55 to the second pump 53. The sterile water sterilization supply section 55 may be, for example, an ultra high temperature instantaneous sterilizer (UHT). The temperature of the sterile water from the sterile water sterilization supply section 55 is, for example, about 1° C. or more and 40° C. or less. This sterile water is sterilized at a sterilization value equal to or higher than that of the sterilized beverage from the beverage cooling section 43 and is used for the mechanical seal of the second pump 53 as described later. As described above, by supplying sterile water to a space surrounding a boundary surface of the mechanical seal, bacteria and microorganisms from the outside world are prevented from being mixed in a sterilized beverage through the boundary surface. By using sterile water at about 1° C. or more and 40° C. or less for the mechanical seal, the temperature of the sterilized beverage passing through the second pump 53 is prevented from rising. It is preferable that a pipe for feeding sterile water from the sterile water sterilization supply section 55 being sterilized (SIP (Sterilizing in Place)) with steam or hot water in advance before the sterile carbonated beverage is filled into the bottle 30.

The carbonated beverage producing section 44 injects carbon dioxide gas into the sterilized beverage cooled by the beverage cooling section 43 to dissolve the carbon dioxide gas in the sterilized beverage to produce a sterile carbonated beverage. A known mechanism such as a carbonator can be used as the carbonated beverage producing section 44. The carbonated beverage producing section 44 is connected to a sterile carbonic acid supply section 54 and is supplied with carbon dioxide gas in a sterilized state, which has been filtered by a filter, from the sterile carbonic acid supply section 54. In the carbonated beverage producing section 44, the carbon dioxide gas from the sterile carbonic acid supply section 54 is introduced into the sterilized beverage at high pressure, and a sterile carbonated beverage in which the carbon dioxide gas is dissolved is prepared.

A third pump (rotary machine) 56 is provided between the carbonated beverage producing section 44 and the second aseptic tank 45. The third pump 56 is for feeding the sterile carbonated beverage from the carbonated beverage producing section 44 to the second aseptic tank 45. As with the second pump 53, sterile water is supplied from the sterile water sterilization supply section 55 to the third pump 56. This sterile water is used for the mechanical seal of the third pump 56.

The second aseptic tank 45 temporarily stores the sterile carbonated beverage in which the carbon dioxide gas is dissolved in the carbonated beverage producing section 44. Sterile carbon dioxide gas is supplied from a sterile carbon dioxide gas supply section 58 into the second aseptic tank 45 and filled in the second aseptic tank 45. By pressurizing the sterile carbonated beverage with sterile carbon dioxide gas, carbon dioxide gas dissolved in the sterile carbonated beverage is prevented from being released into a gas phase. Preferably, it is preferable to pressurize the sterile carbonated beverage at a pressure higher than a carbon dioxide gas pressure as a production standard. As a result, the concentration of carbon dioxide gas in the sterile carbonated beverage is kept constant. The second aseptic tank 45 may not necessarily be provided, and the sterile carbonated beverage from the carbonated beverage producing section 44 may be supplied directly to a filling head tank 75 of the carbonated beverage filling section 20.

A fourth pump (rotary machine) 59 and a filter 62 are interposed between the second aseptic tank 45 and the filling head tank 75 of the carbonated beverage filling section 20. Among these parts, the fourth pump 59 is for feeding the sterile carbonated beverage from the second aseptic tank 45 to the filling head tank 75. As with the second pump 53 and the third pump 56, sterile water is supplied from the sterile water sterilization supply section 55 to the fourth pump 59. This sterile water is used for the mechanical seal of the fourth pump 59. The filter 62 filters impurities, foreign matters, and the like contained in the sterile carbonated beverage fed from the fourth pump 59 to the filling head tank 75. The filter 62 may be provided anywhere up to a tip of a filling valve.

The filling head tank (buffer tank) 75 is disposed in an upper portion of the carbonated beverage filling section 20. A sterile carbonated beverage is filled inside the filling head tank 75. An upper portion of the filling head tank 75 is connected to the sterile carbonic acid supply section 63, and carbon dioxide gas in a sterilized state is supplied from the sterile carbonic acid supply section 63 to the filling head tank 75. By pressurizing the sterile carbonated beverage with the sterile carbon dioxide gas, carbon dioxide gas dissolved in the sterile carbonated beverage is prevented from being released into a gas phase. Preferably, it is preferable to pressurize the sterile carbonated beverage at a pressure higher than a carbon dioxide gas pressure as a production standard. Consequently, the concentration of the carbon dioxide gas in the carbonated beverage in the filling head tank 75 is kept constant.

In the carbonated beverage filling section 20, the sterile carbonated beverage prepared in the carbonated beverage producing section 44 is filled into the empty bottle 30. The carbonated beverage filling section 20 has a rotating convey wheel 71. While a plurality of the bottles 30 is rotated (revolved) by the convey wheel 71, the sterile carbonated beverage is filled inside the bottles 30. Furthermore, a plurality of filling nozzles 72 is arranged along an outer circumference of the convey wheel 71. Each of the filling nozzles 72 has one bottle 30 attached thereto, and injects the sterile carbonated beverage inside the bottle 30. As the filling nozzle 72, a well-known filling nozzle can be used (for example, Japanese Patent No. 4674743). A carbonated beverage supply line 73 and a gas supply line 74 are connected to the filling nozzle 72. The carbonated beverage supply line 73 among these parts has one end connected to the filling head tank 75 filled with the sterile carbonated beverage, and the other end in communication with the inside of the bottle 30. Furthermore, the sterile carbonated beverage supplied from the filling head tank 75 passes through the carbonated beverage supply line 73, and is injected inside the bottle 30. Furthermore, the gas supply line 74 has one end connected to the filling head tank 75 and the other end in communication with the inside of the bottle 30. A counter pressure gas made of sterile carbon dioxide gas supplied from the filling head tank 75 passes through the gas supply line 74 and is filled inside the bottle 30. In addition to the gas supply line 74, snift lines (not shown) are connected to the respective filling valves (not shown), so that the gas inside the bottle 30 can be discharged via the snift line. The snift lines of the respective filling valves are connected by a manifold, and, furthermore, the tip is opened into the filler in the sterile chamber 13. As a result, the gas inside the bottle 30 can be discharged into the filler which is a sterile space without bacterial contamination.

The convey wheel 71 and the filling nozzle 72 are covered with a cover 76. A rotary joint (rotary machine) 77 is attached to an upper portion of the cover 76. A rotating body (the convey wheel 71, the filling nozzle 72, and a rotating pipe 92 (described later), etc.) and a non-rotating body (the cover 76 and a fixed pipe 91 (described later) etc.) are sealed in a sterile state by the rotary joint 77. To the rotary joint 77, a sterilizing gas supply section 64 for sterilization of pipes and a sterile air supply section 65 are connected. Valves 66 and 67 are provided in a supply pipe from the sterilizing gas supply section 64 and a supply pipe from the sterile air supply section 65, respectively. Examples of the sterilizing gas supplied from the sterilizing gas supply section 64 include hydrogen peroxide gas and steam. The sterile air supply section 65 supplies sterile air toward the rotary joint 77 after the supply pipe is sterilized by the sterilizing gas from the sterilizing gas supply section 64. The sterile air from the sterile air supply section 65 is used for the mechanical seal of the rotary joint 77, as will be described later. As described above, by supplying sterile air to a space surrounding a boundary surface of the mechanical seal, bacteria and microorganisms from the outside world are prevented from being mixed in a sterilized beverage through the boundary surface.

The beverage sterilizing section 41, the first aseptic tank 42, the beverage cooling section 43, the carbonated beverage producing section 44, the second aseptic tank 45 and the carbonated beverage filling section 20 are connected by a beverage supply pipeline 60. A beverage (raw material liquid, sterilized beverage or sterile carbonated beverage) sequentially passes through the inside of the beverage supply pipeline 60. In this case, the sterilization degrees inside the beverage cooling section 43, the carbonated beverage producing section 44, the carbonated beverage filling section 20 and the beverage supply pipeline 60 are higher than the sterilization degree of the raw material liquid after sterilization in the beverage sterilizing section 41. As a result, in the process after the beverage sterilizing section 41, the sterilization degree of the beverage (raw material liquid, sterilized beverage or sterile carbonated beverage) can be kept higher than the sterilization degree of the raw material liquid after sterilization in the beverage sterilizing section 41. As a result, even when a carbonated beverage containing components derived from animals or plants such as fruit juice and milk ingredients is filled into the bottle 30, it is possible to reliably prevent propagation of fungi, yeasts and other microorganisms in the filled carbonated beverage.

In the carbonated beverage filling section 20 and the carbonated beverage preparation section 40, a flow path through which the beverage (raw material liquid, sterilized beverage or sterile carbonated beverage) passes is preferably subjected to CIP (Cleaning in Place) treatment and, furthermore, subjected to SIP (Sterilizing in Place) treatment regularly or when the type of beverage is switched. The CIP treatment is performed by passing a cleaner containing water and an alkali agent such as caustic soda as an additive through a flow path from a pipe line of a path through which a raw material liquid is supplied to the beverage sterilizing section 41 to the filling nozzle 72 of the carbonated beverage filling section 20 and then passing a cleaner containing water and an acid agent as an additive. The CIP treatment removes a residue of the previous product in the flow path through which the beverage passes. The SIP treatment is a treatment to sterilize the interior of the flow path through which the beverage passes before beverage filling operation is started, and is performed by passing heated steam or hot water through the flow path cleaned by the CIP treatment described above, for example. The SIP treatment sterilizes the interior of the flow path through which the beverage passes and makes it sterile.

The degree of sterilization of the flow path through which the beverage passes in the carbonated beverage filling section 20 and the carbonated beverage preparation section 40 may be managed by an F value. For example, while heated steam or hot water being flowed in the flow path of the carbonated beverage filling section 20 and the carbonated beverage preparation section 40, temperatures at portions of the flow path, at which the temperatures are difficult to rise while flowing heated steam or hot water within the drink supply pipe line, may be measured by temperature sensors. When the time at which the temperature from each temperature sensor reaches a predetermined temperature reaches a predetermined time or more, the heating treatment by the heated steam or like to the flow path may be ended. Here, the F value is the heating time required to kill all bacteria when the bacteria are heated for a certain time, which is indicated by the lethality time of bacteria at 121.1° C. and is calculated by the following formula.

$$F=\int_{t_0}^{t_1} 10^{(T-T_r)/Z} dt \quad \text{[Formula 1]}$$

(where T denotes an arbitrary sterilization temperature (° C.), $10^{\{(T-Tr)/Z\}}$ denotes a fatality rate at an arbitrary sterilization temperature T, Tr denotes a reference temperature (° C.), and Z denotes a Z value (° C.).)

Next, the configuration of the boundary surface between the rotating body and the non-rotating body of the rotary machine (the second pump 53, the third pump 56, the fourth pump 59 and the rotary joint 77) described above will be described with reference to FIGS. 3 and 4.

Figure 3:
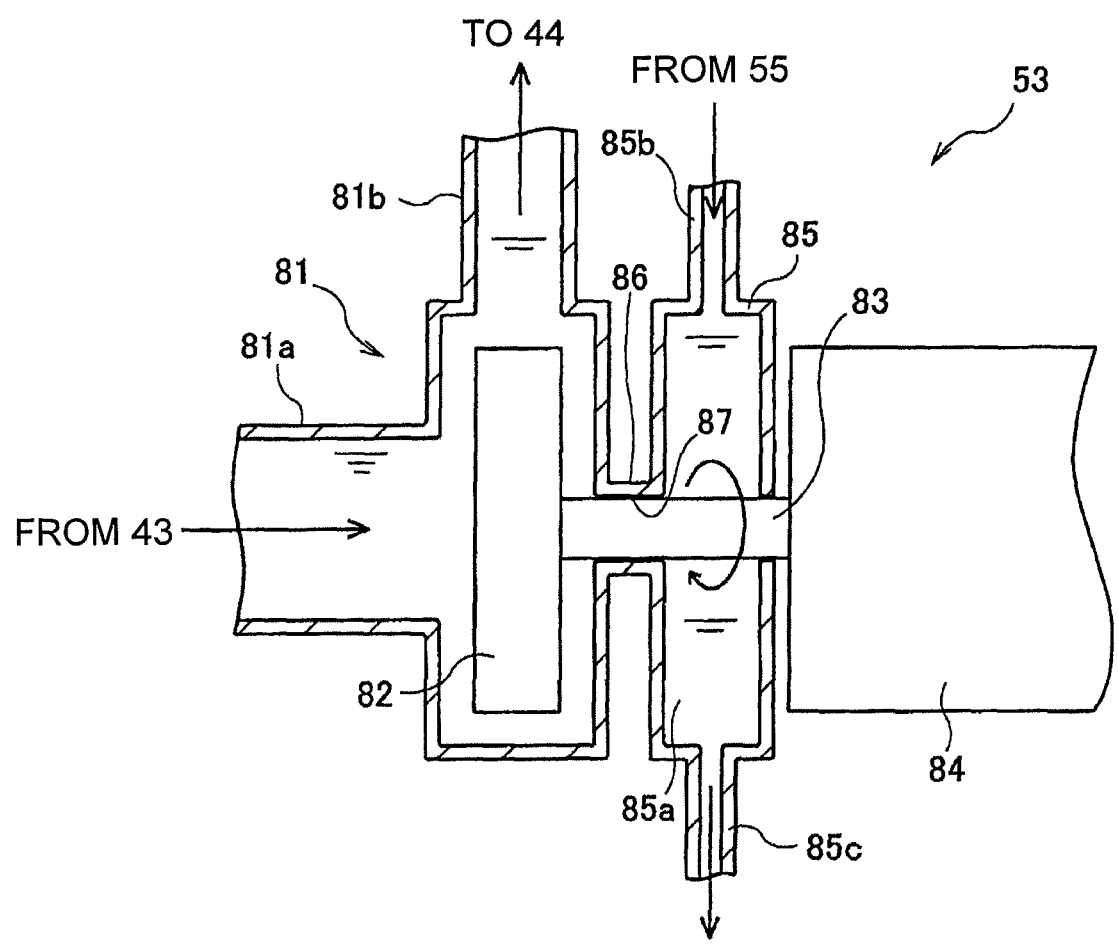
FIG. 3 is a schematic cross-sectional view illustrating a boundary surface between a rotating body and a non-rotating body of a rotary machine constituted of a pump.

First, a rotary machine constituted of a pump will be described with reference to FIG. 3. FIG. 3 is an enlarged cross-sectional view illustrating a boundary surface between a rotating body and a non-rotating body of the rotary machine constituted of the pump. In the following description, the second pump 53 will be described as an example of the rotary machine constituted of the pump; however, the third pump 56 and the fourth pump 59 are substantially similar in configuration.

As illustrated in FIG. 3, the second pump (rotary machine) 53 has a casing 81, an impeller 82 disposed in the casing 81, and a motor 84 connected to the impeller 82 via a rotating shaft 83 and rotating the impeller 82.

Among these parts, the casing 81 has a beverage inlet 81a into which a sterilized beverage flows from the beverage cooling section 43 and a beverage outlet 81b from which the sterilized beverage delivered by the impeller 82 flows out toward the carbonated beverage producing section 44. The beverage inlet 81a and the beverage outlet 81b are connected to the beverage supply pipeline 60. The impeller 82 is disposed inside the casing 81 and is rotated by the motor 84 to feed the sterilized beverage from the beverage inlet 81a to the beverage outlet 81b.

A mechanical seal portion (seal portion) 85 is connected to the casing 81. An internal space 85a is formed in the mechanical seal portion 85. A sterile water inlet 85b and a sterile water outlet 85c are communicated with the internal space 85a. The sterile water from the sterile water sterilization supply section 55 is supplied from the sterile water inlet 85b to the internal space 85a and discharged from the sterile water outlet 85c.

In FIG. 3, a connecting portion 86 is provided between the casing 81 and the mechanical seal portion 85. The connecting portion 86 has a substantially cylindrical shape, and the rotating shaft 83 is inserted through the connecting portion 86. In this case, the connecting portion 86 is a non-rotating body, and the rotating shaft 83 is a rotating body. A boundary surface 87 is formed between the connecting portion 86 constituted of a non-rotating body and the rotating shaft 83 constituted of a rotating body. At the boundary surface 87, the sterilized beverage in the casing 81 is sealed with sterile water in the mechanical seal portion 85. As a result, bacteria and microorganisms from the outside world are prevented from being mixed in the sterilized beverage through the boundary surface 87.

The temperature of the sterile water in the mechanical seal portion 85 is, for example, 1° C. or more and 40° C. or less, and more preferably 10° C. or more and 25° C. or less. Thus, there is no possibility that the temperature of the sterilized beverage staying in the casing 81 will rise due to the effect of sterile water in the mechanical seal portion 85. This prevents problems such as generation of a large amount of foam (foaming) from the carbonated beverage in the bottle 30 and unstable carbonic acid gas concentration in the carbonated beverage when filling the carbonated beverage.

The internal pressure of the mechanical seal portion 85 (pressure of the internal space 85a) sealing the boundary surface 87 is lower than the internal pressures of the beverage supply pipeline 60 and the casing 81. This makes it possible to more reliably prevent bacteria and microorganisms from the outside world from being mixed in the sterilized beverage through the boundary surface 87.

As described above, the first pump 51 for feeding the sterilized beverage before carbonic acid filling from the first aseptic tank 42 to the beverage cooling section 43 supplies steam to the mechanical seal portion. However, the present invention is not limited to this. For the first pump 51, as with the second pump 53, sterile water may be supplied to the mechanical seal portion.

Figure 4:
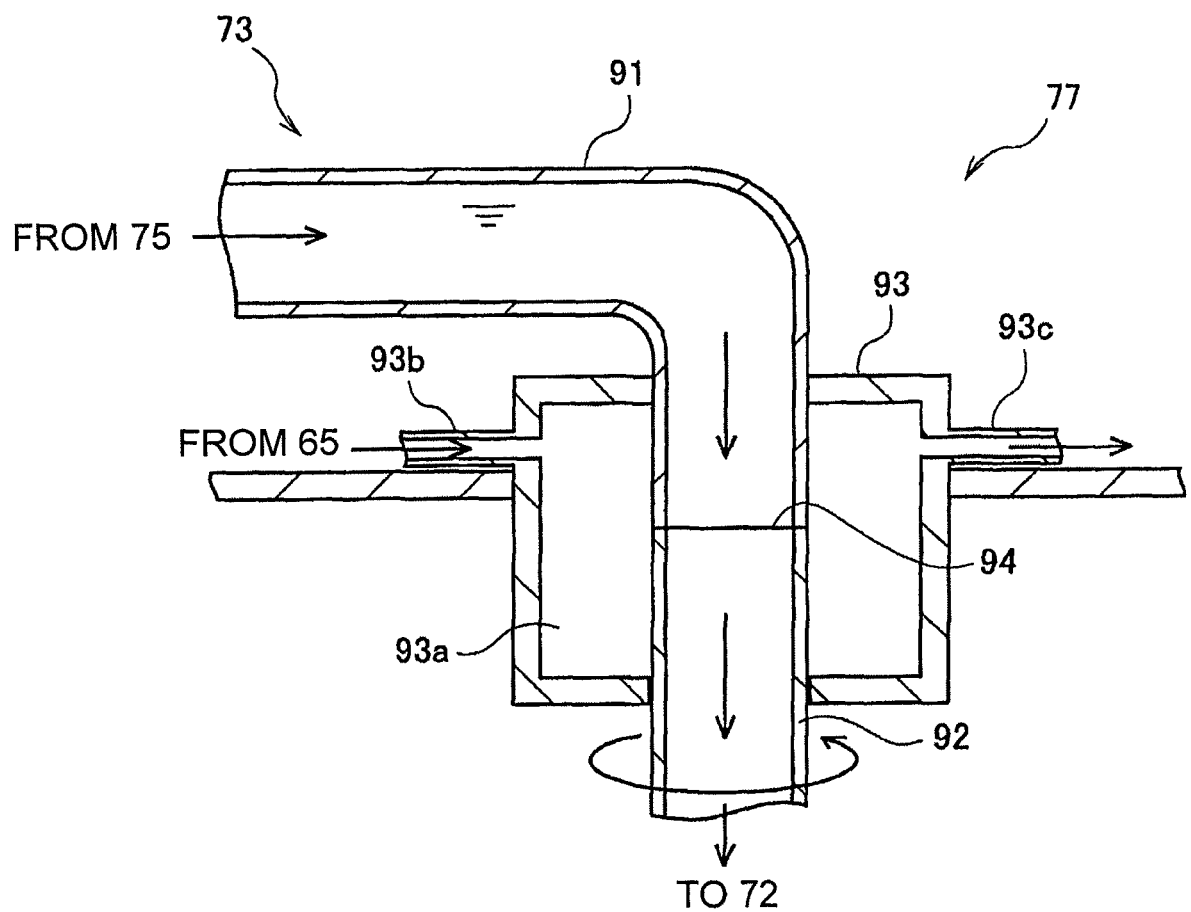
FIG. 4 is a schematic cross-sectional view illustrating a boundary surface between a rotating body and a non-rotating body of a rotary machine constituted of a rotary joint.

Next, a rotary machine constituted of a rotary joint will be described with reference to FIG. 4. FIG. 4 is an enlarged cross-sectional view illustrating a boundary surface between a rotating body and a non-rotating body of the rotary machine constituted of the rotary joint, and specifically an enlarged cross-sectional view of the rotary joint 77 of the carbonated beverage filling section 20.

As illustrated in FIG. 4, the rotary joint (rotary machine) 77 has the fixed pipe 91 connected to the filling head tank 75 side and the rotating pipe 92 connected to the filling nozzle 72 side.

Among these parts, the fixed pipe 91 is a pipe into which the sterile carbonated drink from the filling head tank 75 flows. The rotating pipe 92 is a pipe to feed the sterile carbonated beverage from the fixed pipe 91 toward the filling nozzle 72, and is rotated together with the convey wheel 71 and the filling nozzle 72. The fixed pipe 91 and the rotating pipe 92 constitute a portion of the carbonated beverage supply line 73 described above.

A mechanical seal portion (seal portion) 93 is connected to the fixed pipe 91 and the rotating pipe 92. An internal space 93a is formed in the mechanical seal portion 93. A sterile air inlet 93b and a sterile air outlet 93c are communicated with the internal space 93a. The sterile air from the sterile air supply section 65 is supplied from the sterile air inlet 93b to the internal space 93a and then discharged from the sterile air outlet 93c.

In FIG. 4, the fixed pipe 91 is a non-rotating body, and the rotating pipe 92 is a rotating body. A boundary surface 94 is formed between the fixed pipe 91 constituted of a non-rotating body and the rotating pipe 92 constituted of a rotating body. At the boundary surface 94, the sterile carbonated beverage flowing inside the fixed pipe 91 and the rotating pipe 92 is sealed with sterile air in the mechanical seal portion 93. As a result, bacteria and microorganisms from the outside world are prevented from being mixed in the sterile carbonated beverage through the boundary surface 94.

The temperature of the sterile air in the mechanical seal portion 93 is, for example, 1° C. or more and 40° C. or less, and more preferably 10° C. or more and 25° C. or less. Thus, there is no possibility that the temperature of the sterile carbonated beverage staying in the fixed pipe 91 and the rotating pipe 92 will rise due to the effect of sterile air in the mechanical seal portion 93. This prevents problems such as generation of a large amount of foam (foaming) from the carbonated beverage in the bottle 30 and unstable carbonic acid gas concentration in the carbonated beverage when filling the carbonated beverage.

The internal pressure of the mechanical seal portion 93 (pressure of the internal space 93a) sealing the boundary surface 94 is lower than the internal pressures of the fixed pipe 91 and the rotating pipe 92 located inside the rotary joint 77. This makes it possible to more reliably prevent bacteria and microorganisms from the outside world from being mixed in the sterile carbonated beverage through the boundary surface 94.

(Sterile Carbonated Beverage Filling Method)

Next, a sterile carbonated beverage filling method using the above-described sterile carbonated beverage filling system 10 (FIG. 1) will be described. In the following description, a filling method at a normal time, that is, a sterile carbonated beverage filling method in which a sterile carbonated beverage is filled inside the bottle 30 to produce the product bottle 35 will be described.

First, the plurality of empty bottles 30 is sequentially fed from the outside of the sterile carbonated beverage filling system 10 to the bottle feeding section 21. The bottle 30 is fed from the bottle feeding section 21 to the bottle sterilizing section 11 by the convey wheel 12 (container feeding step).

Then, in the bottle sterilizing section 11, the bottle 30 is sterilized using a hydrogen peroxide aqueous solution as a disinfectant (sterilization step). At this time, the hydrogen peroxide aqueous solution is a gas or mist condensed after a hydrogen peroxide aqueous solution having a concentration of 1% by weight or more, preferably 35% by weight is temporarily vaporized, and the gas or mist is supplied toward the bottle 30.

Subsequently, the bottle 30 is fed to the air rinsing section 14 by the convey wheel 12, and sterile heated air or room temperature air is supplied in the air rinsing section 14, whereby foreign matter, hydrogen peroxide, and the like are removed from the bottle 30 while hydrogen peroxide is activated. Subsequently, the bottle 30 is conveyed to the sterile water rinsing section 15 by the convey wheel 12. In the sterile water rinsing section 15, washing with sterile water at 15° C. or more and 85° C. or less is performed (rinsing step). Specifically, sterile water at 15° C. or more and 85° C. or less is supplied into the bottle 30 at a flow rate of 5 L/min or more and 15 L/min or less. At this time, preferably, the bottle 30 takes an inverted attitude, and the sterile water is supplied into the bottle 30 through the downwardly opened mouth, and flows out of the bottle 30 from the mouth. With this sterile water, hydrogen peroxide adhering to the bottle 30 is washed off, and foreign matter is removed. The step of supplying sterile water into the bottle 30 is not necessarily provided.

Subsequently, the bottle 30 is conveyed to the carbonated beverage filling section 20 by the convey wheel 12. In the carbonated beverage filling section 20, while the bottle 30 is rotated (revolved), the sterile carbonated beverage is filled inside the bottle 30 from the mouth (filling step). In the carbonated beverage filling section 20, the sterile carbonated beverage prepared in advance in the carbonated beverage preparation section 40 is filled in the sterilized bottle 30 at a filling temperature of 1° C. or higher and 40° C. or lower, preferably 5° C. or higher and 10° C. or lower.

Next, each step of preparing a sterile carbonated beverage in the carbonated beverage preparation section 40 and supplying the sterile carbonated beverage to the carbonated beverage filling section 20 will be described with reference to FIG. 2.

First, for example, the beverage sterilizing section 41 constituted of an ultra high temperature instantaneous sterilizer (UHT) sterilizes a raw material liquid containing components derived from animals or plants such as fruit juice and milk ingredients to produce a sterilized beverage (sterilization step). Meanwhile, a raw material liquid is supplied from the outside to the beverage sterilizing section 41, and this raw material liquid is instantaneously heated and sterilized to prepare a sterilized beverage.

The sterilized beverage sterilized by the beverage sterilizing section 41 is fed to the first aseptic tank 42 and temporarily stored in the first aseptic tank 42 (first storage step). Subsequently, the sterilized beverage from the first aseptic tank 42 is fed to the beverage cooling section 43 by the first pump 51. In the beverage cooling section 43, the sterilized beverage prepared in the beverage sterilizing section 41 is cooled to, for example, 1° C. or higher and 5° C. or lower (cooling step).

The sterilized beverage cooled by the beverage cooling section 43 is fed to the carbonated beverage producing section 44 such as a carbonator by the second pump 53. In the carbonated beverage producing section 44, carbonic acid gas is injected into the sterilized beverage cooled by the beverage cooling section 43 to prepare a sterile carbonated beverage (carbonated beverage production step).

Next, the sterile carbonated beverage from the carbonated beverage producing section 44 is fed to the second aseptic tank 45 by the third pump 56. The sterile carbonated beverage fed to the second aseptic tank 45 is temporarily stored in the second aseptic tank 45 (second storage step). Subsequently, the sterile carbonated beverage from the second aseptic tank 45 is fed to the filling head tank 75 of the carbonated beverage filling section 20 by the fourth pump 59. The sterile carbonated beverage fed to the filling head tank 75 is temporarily stored in the filling head tank 75 (third storage step).

When the beverage (raw material liquid, sterilized beverage or sterile carbonated beverage) is sequentially fed from the beverage sterilizing section 41 to the carbonated beverage filling section 20 via the first aseptic tank 42, the beverage cooling section 43, the carbonated beverage producing section 44, and the second aseptic tank 45 in order, the beverage sequentially passes through the beverage supply pipeline 60. In this case, the sterilization degrees inside the beverage cooling section 43, the carbonated beverage producing section 44, the carbonated beverage filling section 20 and the beverage supply pipeline 60 are higher than the sterilization degree of the raw material liquid in the beverage sterilizing section 41.

After that, in the carbonated beverage filling section 20, the sterile carbonated beverage prepared in the carbonated beverage producing section 44 and stored in the filling head tank 75 is filled into the empty bottle 30.

Meanwhile, first, in the carbonated beverage filling section 20, the filling nozzle 72 is brought into close contact with the mouth of the bottle 30, and the gas supply line 74 and the bottle 30 communicate with each other. Next, a sterile carbon dioxide gas for counter pressure is supplied into the bottle 30 from the filling head tank 75 through the gas supply line 74. As a result, the internal pressure of the bottle 30 is raised higher than the atmospheric pressure, so that the internal pressure of the bottle 30 becomes equal to the internal pressure of the filling head tank 75.

Next, the sterile carbonated beverage is filled into the bottle 30 from the carbonated beverage supply line 73. In this case, the sterile carbonated beverage passes through the carbonated beverage supply line 73 from the filling head tank 75 and is injected into the bottle 30.

Subsequently, the supply of the sterile carbonated beverage from the carbonated beverage supply line 73 is stopped. Then, the snift line (not shown) is opened, and the gas inside the bottle 30 is exhausted from the snift line. Consequently, the pressure inside the bottle 30 becomes equal to the atmospheric pressure, and filling of the sterile carbonated beverage into the bottle 30 is finished.

Referring again to FIG. 1, the bottle 30 filled with the sterile carbonated beverage by the carbonated beverage filling section 20 is conveyed to the cap attachment section 16 by the convey wheel 12.

On the other hand, the cap 33 is previously sterilized by the cap sterilizing section 25 (cap sterilization step). The cap 33 sterilized by the cap sterilizing section 25 is attached to the mouth of the bottle 30 which has been conveyed from the carbonated beverage filling section 20 in the cap attachment section 16. Consequently, the product bottle 35 having the bottle 30 and the cap 33 is obtained (cap attachment step).

Thereafter, the product bottle 35 is conveyed from the cap attachment section 16 to the product bottle conveyor 22 and is carried toward the outside of the sterile carbonated beverage filling system 10.

The respective steps from the sterilization step to the cap attachment step are performed in a sterile atmosphere surrounded by the sterile chamber 13, that is, in a sterile environment. After the sterilization treatment, sterile air of positive pressure is supplied into the sterile chamber 13 so that the sterile air is always blown toward the exterior of the sterile chamber 13.

The production (conveying) speed of the bottle 30 in the sterile carbonated beverage filling system 10 is preferably 100 bpm or more and 1500 bpm or less. Here, the conveying speed of the bottle 30 per minute is represented by bottle per minute (bpm).

As described above, according to the present embodiment, there is no step of filling the bottle 30 with the sterile carbonated beverage by the carbonated beverage filling section 20 and then heat-sterilizing the carbonated beverage filled in the bottle 30 (for example, heat treatment at a liquid temperature of 60° C. or higher and 65° C. or lower for about 10 minutes). Consequently, even when the bottle 30 is filled with a carbonated beverage containing a nitrogen source such as fruit juice and milk ingredients, there is no possibility that the carbonated beverage will be altered. Since the bottle 30 does not expand during the heat sterilization treatment, it is possible to prevent the inconvenience that the bottle 30 is deformed.

According to the present embodiment, the boundary surface 87 between the rotating shaft (rotating body) 83 of the pumps (rotary machines) 53, 56, or 59 and the connecting portion (non-rotating body) 86 is sealed with sterile water. On the other hand, the boundary surface 94 between the rotating pipe (rotating body) 92 of the rotary joint (rotary machine) 77 and the fixed pipe (non-rotating body) 91 is sealed with sterile air. This prevents the liquid temperature of the carbonated beverage staying in the vicinity of the mechanical seal portions 85 and 93 from rising unlike the case where steam is supplied to the seal portion of the rotary machine. This prevents problems such as generation of a large amount of foam (foaming) from the carbonated beverage in the bottle 30 and unstable carbonic acid gas concentration in the carbonated beverage when filling the carbonated beverage. Particularly, even when the sterile carbonated beverage filling system 10 is temporarily stopped and the carbonated beverage stays in the vicinity of the mechanical seal portions 85 and 93, there do not occur problems such as generation of a large amount of foam from the carbonated beverage in the bottle 30 and unstable carbonic acid gas concentration in the carbonated beverage after filling is started again.

According to the present embodiment, the sterilization degrees inside the beverage cooling section 43, the carbonated beverage producing section 44, the carbonated beverage filling section 20 and the beverage supply pipeline 60 are higher than the sterilization degree of the beverage sterilizing section 41. As a result, in the process after the beverage sterilizing section 41, the sterilization degree of the beverage (raw material liquid, sterilized beverage or sterile carbonated beverage) can be kept higher than the sterilization degree of the raw material liquid in the beverage sterilizing section 41. As a result, even when a carbonated beverage containing components derived from animals or plants such as fruit juice and milk ingredients is filled into the bottle 30, it is possible to reliably prevent propagation of fungi, yeasts and other microorganisms in the filled carbonated beverage.

In the above description, although container sterilization performed on the bottle 30, the preform, the cap 33, and the like uses a sterilizing agent containing hydrogen peroxide, the present invention is not limited to this example, and the sterilization may be performed using a sterilizing agent such as peracetic acid or an electron beam.

The invention claimed is:

1. A sterile carbonated beverage filling system, comprising:
    a beverage sterilizing section which sterilizes a raw material liquid to prepare a sterilized beverage;
    a beverage cooling section which cools the sterilized beverage prepared by the beverage sterilizing section;
    a carbonated beverage producing section which injects carbonic acid gas into the sterilized beverage cooled by the beverage cooling section to prepare a sterile carbonated beverage;
    a carbonated beverage filling section which fills the sterile carbonated beverage, prepared by the carbonated beverage producing section, into a bottle; and
    a beverage supply pipeline which connects the beverage sterilizing section, the beverage cooling section, the carbonated beverage producing section, and the carbonated beverage filling section,
    wherein the beverage supply pipeline comprises pumps, each pump having a casing, a rotating shaft as a rotating body, a connecting portion as a non-rotating body and through which the rotating shaft is inserted, and a mechanical seal portion which is connected to the casing via the connecting portion,
    the pumps include a first pump, which is arranged upstream of the beverage cooling section, and a second pump, which is arranged downstream of the beverage cooling section,
    the sterilized beverage or the sterile carbonated beverage is flowed through the casing of the second pump,
    a boundary surface between the rotating shaft and the connecting portion of the second pump is sealed with sterile water at a temperature of 1° C. or more and 40° C. or less, so as to reduce a rising in a temperature of the sterilized beverage or the sterile carbonated beverage staying in the casing of the second pump,
    the sterilized beverage is flowed through the casing of the first pump, and
    the mechanical seal portion of the first pump is sealed with steam.

2. The sterile carbonated beverage filling system according to claim 1, wherein an internal pressure of the mechanical seal portion which seals the boundary surface of the second pump is lower than an internal pressure of the beverage supply pipeline.

3. A sterile carbonated beverage filling method, comprising:
    a sterilization step of sterilizing a raw material liquid in a beverage sterilizing section to prepare a sterilized beverage;
    a cooling step of cooling the sterilized beverage, prepared by the beverage sterilizing section, in a beverage cooling section;
    a carbonated beverage producing step of injecting carbonic acid gas into the sterilized beverage, cooled by the beverage cooling section, in a carbonated beverage producing section to prepare a sterile carbonated beverage; and
    a filling step of filling the sterile carbonated beverage, prepared by the carbonated beverage producing section, into a bottle in a carbonated beverage filling section,
    wherein the beverage sterilizing section, the beverage cooling section, the carbonated beverage producing section, and the carbonated beverage filling section are connected by a beverage supply pipeline,
    the beverage supply pipeline comprises pumps, each pump having a casing, a rotating shaft as a rotating body, a connecting portion as a non-rotating body and through which the rotating shaft is inserted, and a mechanical seal portion which is connected to the casing via the connecting portion,
    the pumps include a first pump, which is arranged upstream of the beverage cooling section, and a second pump, which is arranged downstream of the beverage cooling section,
    the sterilized beverage or the sterile carbonated beverage is flowed through the casing of the second pump,
    a boundary surface between the rotating shaft and the connecting portion of the second pump is sealed with sterile water at a temperature of 1° C. or more and 40° C. or less, so as to reduce a rising in a temperature of the sterilized beverage or the sterile carbonated beverage staying in the casing of the second pump,
    the sterilized beverage is flowed through the casing of the first pump, and
    the mechanical seal portion of the first pump is sealed with steam.

4. The sterile carbonated beverage filling system according to claim 1, wherein the second pump is provided between the beverage cooling section and the carbonated beverage producing section.

5. The sterile carbonated beverage filling system according to claim 1, wherein the second pump is provided between the carbonated beverage producing section and the carbonated beverage filling section.

6. The sterile carbonated beverage filling method according to claim 3, wherein the second pump is provided between the beverage cooling section and the carbonated beverage producing section.

7. The sterile carbonated beverage filling method according to claim 3, wherein the second pump is provided between the carbonated beverage producing section and the carbonated beverage filling section.

* * * * *